US010658003B1

(12) United States Patent
Du et al.

(10) Patent No.: US 10,658,003 B1
(45) Date of Patent: May 19, 2020

(54) USING DIPULSE RESPONSE TO DETECT CHANNEL PARAMETERS (71) Applicant: Marvell International Ltd., Hamilton (BM)

(72) Inventors: Ke Du, Fremont, CA (US); Hongxin Song, Sunnyvale, CA (US); Jun Gao, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 16/248,266

(22) Filed: Jan. 15, 2019

Related U.S. Application Data (60) Provisional application No. 62/620,937, filed on Jan. 23, 2018, provisional application No. 62/617,973, filed on Jan. 16, 2018.

(51) Int. Cl.
G11B 27/36 (2006.01)
G11B 20/10 (2006.01)
G06F 7/58 (2006.01)

(52) U.S. Cl.
CPC ........ G11B 20/10277 (2013.01); G06F 7/582 (2013.01)

(58) Field of Classification Search
CPC ....... G11B 5/00; G11B 5/09; G11B 20/10009; G11B 27/36; G11B 20/12; G11B 20/18; G11B 20/10; G11B 20/1419
USPC ............. 360/48, 25, 31, 46, 53, 39; 369/116
See application file for complete search history.

(56) References Cited

U.S. PATENT DOCUMENTS

| | | | |
|---|---|---|---|
| 6,208,477 B1* | 3/2001 | Cloke | G11B 20/10009 360/25 |
| 6,292,912 B1* | 9/2001 | Cloke | G11B 20/1816 360/31 |
| 6,449,110 B1* | 9/2002 | DeGroat | G11B 5/012 360/31 |
| 6,731,443 B2* | 5/2004 | Bliss | G11B 20/10009 360/45 |
| 7,245,444 B2* | 7/2007 | Galbraith | G11B 20/10009 360/46 |
| 7,538,967 B1 | 5/2009 | Yang et al. | |
| 7,869,312 B1 | 1/2011 | Li et al. | |
| 8,000,193 B1 | 8/2011 | Liu et al. | |
| 8,958,276 B1 | 2/2015 | Pandana et al. | |
| 2015/0170707 A1* | 6/2015 | Hanson | G11B 20/10398 360/31 |

* cited by examiner

Primary Examiner — Nabil Z Hindi

(57) ABSTRACT

A receiver device receives a signal via a communication channel, the signal (i) having been transmitted by a transmitter device, and (ii) corresponding to a pseudorandom bit sequence (PRBS). The receiver device correlates the received signal with a known signal to generate a correlation signal. The known signal includes the PRBS. The receiver device identifies one or more characteristics of the correlation signal, and determines one or more parameters of the communication channel using the identified one or more characteristics of the correlation signal. The receiver device i) uses the one or more parameters corresponding to the communication channel to process subsequent signals received via the communication channel, and/or ii) communicates the one or more parameters to the transmitter device to prompt the transmitter device to preprocess subsequent signals to be transmitted via the communication channel by the transmitter device.

20 Claims, 9 Drawing Sheets

FIG. 1

*PRIOR ART*

FIG. 2

PRIOR ART

FIG. 9 though the magnetic head 116) will also
USING DIPULSE RESPONSE TO DETECT CHANNEL PARAMETERS

CROSS REFERENCES TO RELATED APPLICATIONS

This application claims the benefit of U.S. Provisional Patent Application No. 62/617,973, entitled "Using Dipulse Response to Detect Frequency Offset in Disk Drives," filed on Jan. 16, 2018, and U.S. Provisional Patent Application No. 62/620,937, entitled "Using Dipulse Response to Detect Inter Track Interference in Disk Drives," filed on Jan. 23, 2018. Both of the applications referenced above are hereby incorporated by reference in their entireties.

FIELD OF TECHNOLOGY

The present disclosure relates generally to disk drives, and more particularly, to detecting channel characteristics corresponding to a disk drive.

BACKGROUND

Figure 1:
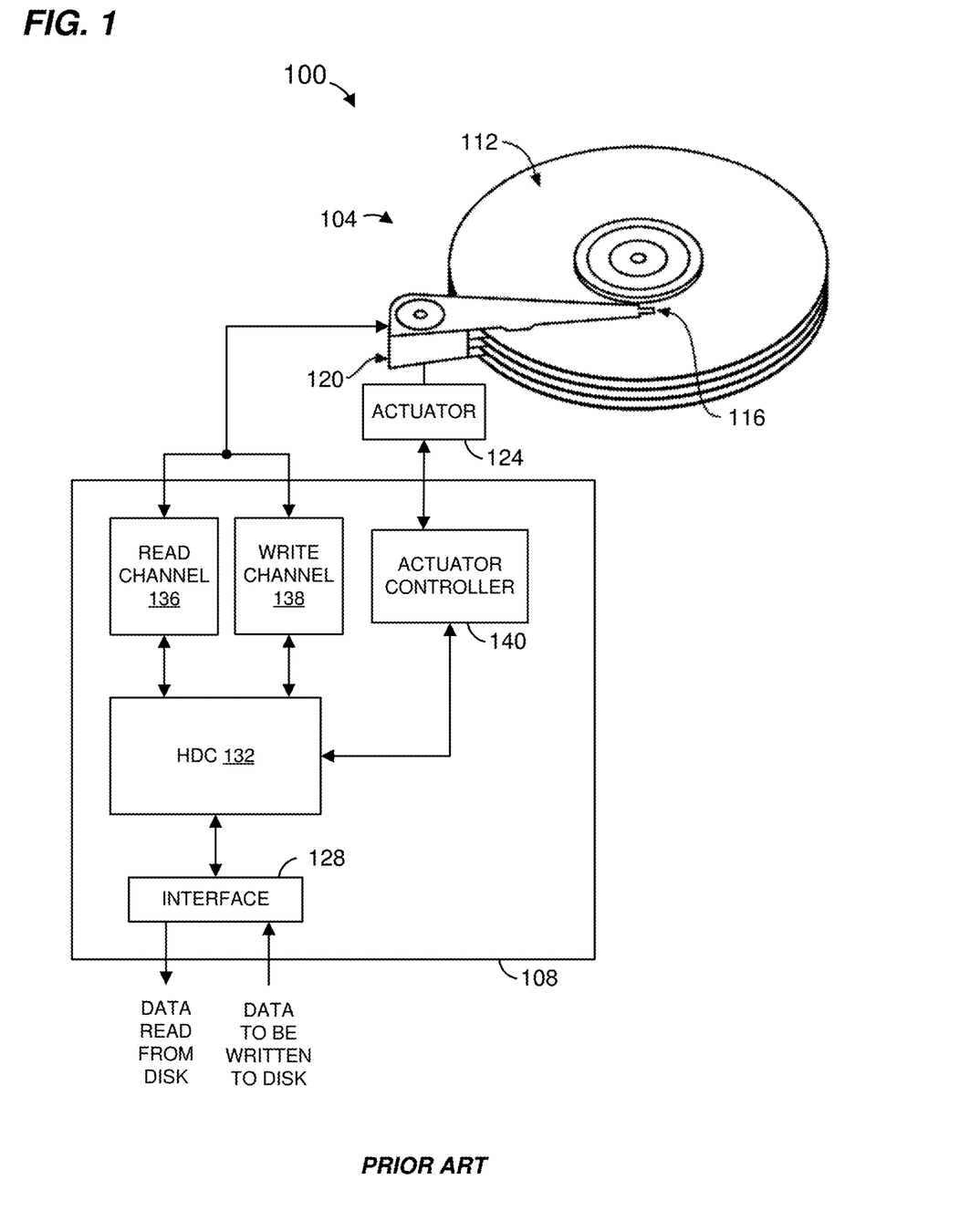
FIG. 1 a block diagram of prior art magnetic disk drive system.

FIG. 1 is a block diagram of an example prior art magnetic disk drive system 100 having a hard disk assembly 104 and a hard disk control system 108. The hard disk assembly 104 includes one or more magnetic disks 112 and one or more corresponding magnetic heads 116 on a moving arm 120. The moving arm 120 is coupled to an actuator 124 that is used to position the magnetic heads 116 over the magnetic disks 112. The hard disk control system 108 includes an interface 128 that receives data to be written to the one or more magnetic disks 112 and transmits data read from the one or more magnetic disks 112. The interface 128 is communicatively coupled to a microprocessor of a computing system such as a server, a personal computer, a network attached storage (NAS) device, etc., or of a consumer electronics device such as a smart phone, a set top box, a gaming system, etc., to allow the microprocessor to store data to and read data from the one or more magnetic disks 112. The interface 128 is coupled to a hard disk controller (HDC) 132. The HDC 132 is in turn coupled to a read channel device 136, a write channel device 138, and an actuator controller 140. The read channel device 136 and the write channel device 138 are coupled to the magnetic heads 116. The actuator controller 140 is coupled to the actuator 124. Optionally, the read channel device 136 and/or the write channel device 138 are coupled to the actuator controller 140.

Data to be written to the disks 112 are received via the interface 128. The HDC 132 transmits signals to the actuator controller 140 indicating the disk and the track on which data is to be written. During positioning, the read channel device 136 reads position signal information from the appropriate disk 112 and provides this position signal information to the actuator controller 140. The actuator controller 140 uses the position signal information from the read channel device 136 to accurately position the appropriate magnetic head 116 to the desired track. Meanwhile, the HDC 132 provides the data to be written to the write channel device 138. Once the magnetic heads 116 are appropriately positioned, the write channel device 138 generates an analog write signal and provides the analog write signal to the appropriate magnetic head 116 such that the data is magnetically stored on the disk 112 at the desired position.

When data is to be read from one of the disks 112, the microprocessor of the computing device or consumer electronics device provides a request to the interface 128, indicating the data to be read. The interface 128 provides the indication to the HDC 132. Then, the HDC 132 transmits signals to the actuator controller 140 indicating the disk and the track from which data is to be read. During positioning, the read channel device 136 generates position signals based on position information written on the disk 112 and provides these position signals to the actuator controller 140. The actuator controller 140 uses the position signals to accurately position the magnetic head 116 to a center of a desired track. Additionally, the HDC 132 indicates to the read channel device 136 from which of the disks 112 (if there are multiple disks) to read and when to begin reading so that data from an appropriate portion on the disk 112 will be read. In response, at the appropriate time, the read channel device 136 generates a digital signal from an analog signal received from the magnetic head 116. This digital signal is provided to the HDC 132. The HDC 132 provides the retrieved data to the interface 128, which in turn provides the retrieved data to the requesting microprocessor.

Figure 2:
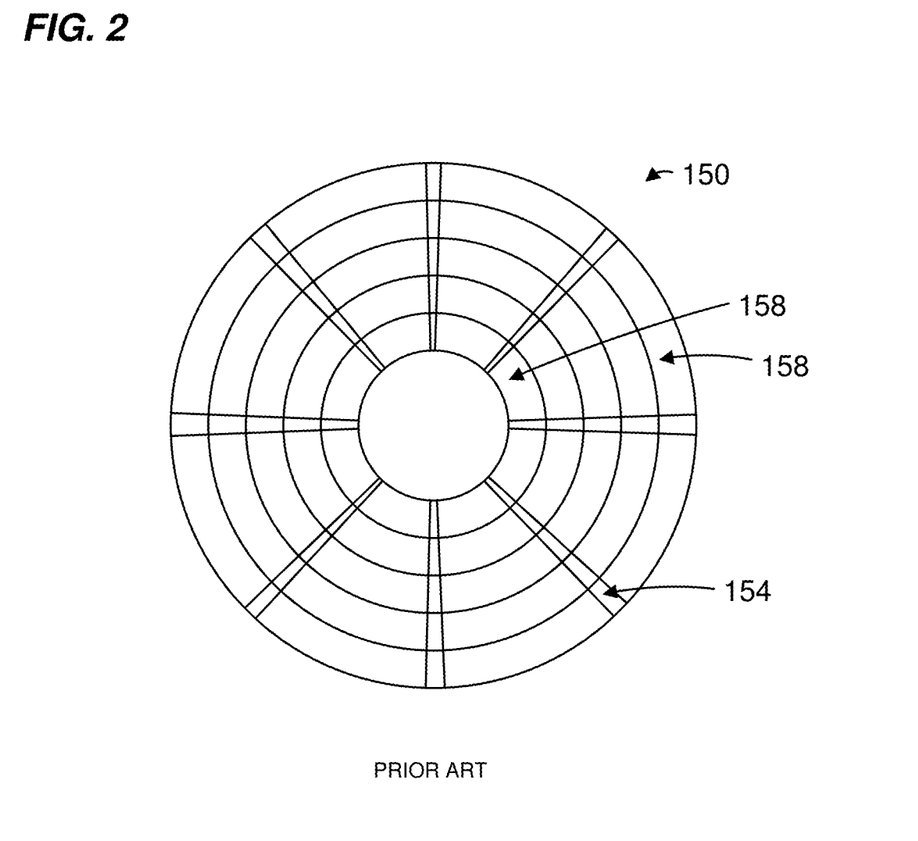
FIG. 2 is an illustration of an example magnetic media disk that is utilized in the disk drive system of FIG. 1.

FIG. 2 is an illustration of an example magnetic media disk 150 that is utilized in the disk drive system 100 of FIG. 1. The disk 150 includes a plurality of servo field areas 154 that generally radiate outwardly from the center of the disk 150. Each servo field area 154 is generally wedge shaped. Additionally, the disk 150 is generally partitioned into a plurality of concentric regions referred to as tracks 158. A servo field area 154 within a particular track 158 is sometimes referred to as a servo mark. Each servo mark includes data which is pre-written on the disk 150 during manufacturing, and such data includes data concerning the location of the servo mark on the disk 150, such as the particular servo field area to which the servo mark corresponds and the track in which the servo mark is located. As can be seen in FIG. 2, each track 158 includes several servo marks. The servo mark data is used by the hard disk system to position the magnetic head 116 during read and write operations. Data to be stored is written in the tracks 158 between the servo fields.

Referring again to FIG. 1, a frequency at which bits are written to the disk 112 (write frequency) is typically offset from a frequency of a clock used by the read channel device 136. Such a frequency offset adversely affects the reading of data from the disk 112.

Additionally, when the magnetic head 116 is positioned over a particular track, the magnetic head 116 will typically generate an interference signal from an adjacent track (sometimes referred to as "intertrack interference"). Such intertrack interference also adversely affects the reading of data from the disk 112.

Further, other technical limitations of the read channel device 136, the write channel device 138, and/or the magnetic head 116 can further adversely affect the reading of data from the disk 112. For example, asymmetry corresponding to an amplitude difference between positive peaks and negative peaks in a readback signal (which may be caused by characteristics of the magnetic head 116) will also adversely affect the reading of data from the disk 112.

SUMMARY

In an embodiment, a method includes: receiving, at a receiver device, a signal via a communication channel, the signal (i) having been transmitted by a transmitter device, and (ii) corresponding to a pseudorandom bit sequence (PRBS); correlating, at the receiver device, the received signal with a known signal to generate a correlation signal, wherein the known signal includes the PRBS; identifying, at the receiver device, one or more characteristics of the correlation signal; and determining, at the receiver device, one or more parameters of the communication channel using the identified one or more characteristics of the correlation signal. The method further includes at least one of: i) using, at the receiver device, the one or more parameters corresponding to the communication channel to process subsequent signals received via the communication channel; and ii) communicating, by the receiver device, the one or more parameters to the transmitter device to prompt the transmitter device to preprocess subsequent signals to be transmitted via the communication channel by the transmitter device.

In another embodiment, an apparatus comprises: one or more integrated circuit (IC) devices. The one or more IC devices include circuitry configured to: receive a signal via a communication channel, the signal (i) having been transmitted by a transmitter device, and (ii) corresponding to a pseudorandom bit sequence (PRBS); correlate the received signal with a known signal to generate a correlation signal, wherein the known signal includes the PRBS; identify one or more characteristics of the correlation signal; and determine one or more parameters of the communication channel using the identified one or more characteristics of the correlation signal. The circuitry is further configured to, at least one of: i) use the one or more parameters corresponding to the communication channel to process subsequent signals received via the communication channel; and ii) communicate the one or more parameters to the transmitter device to prompt the transmitter device to preprocess subsequent signals to be transmitted via the communication channel by the transmitter device.

DETAILED DESCRIPTION

Figure 3:
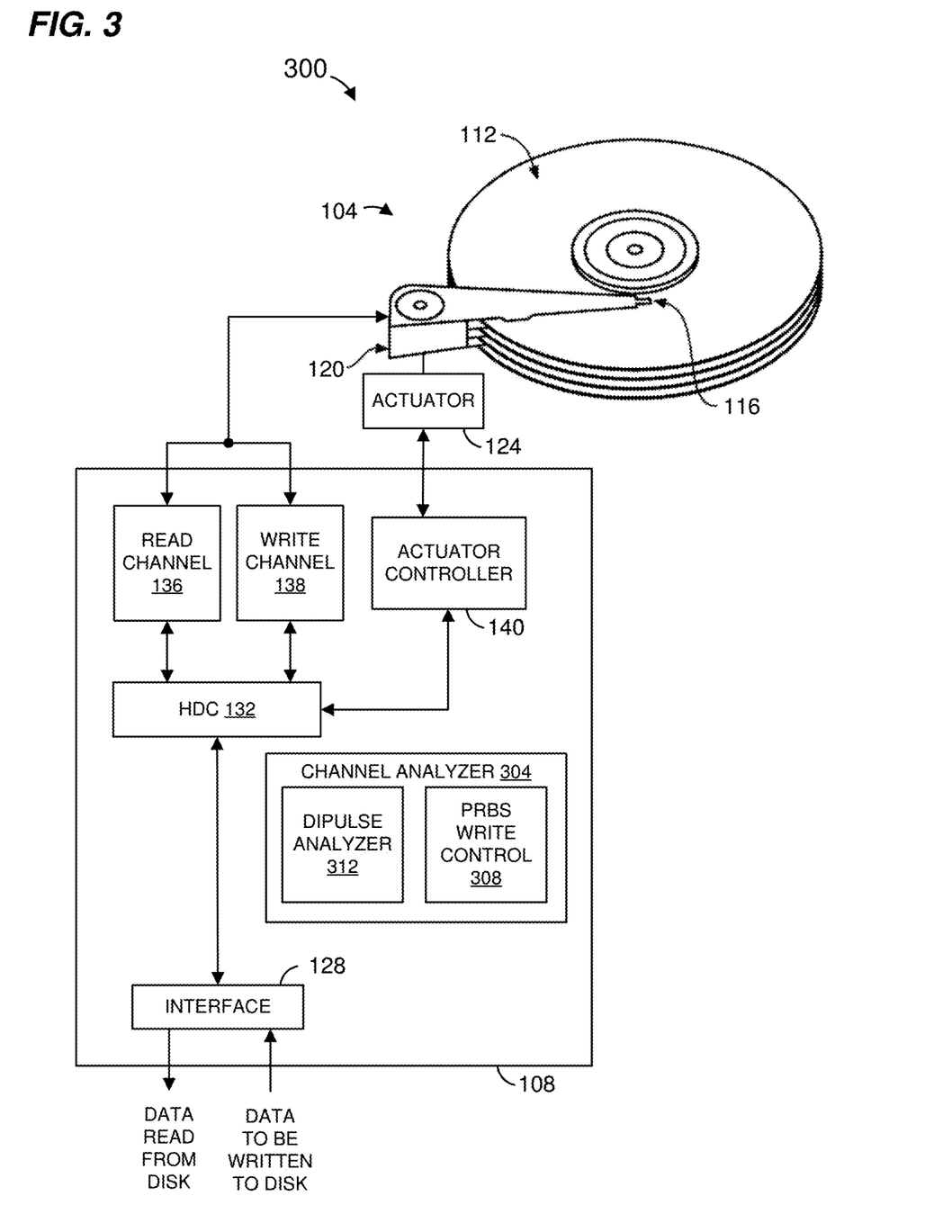
FIG. 3 is a block diagram of an example magnetic disk drive system, according to an embodiment.

FIG. 3 is a block diagram of an example magnetic disk drive system 300, according to an embodiment. The disk drive system 300 includes some components that are similar to the disk drive system 100 of FIG. 1, and like-numbered elements are not described in detail for purposes of brevity.

Referring to FIG. 3, the hard disk control system 108 includes a channel analyzer 304 coupled to the read channel device 136, the write channel device 138, and the actuator controller 140. The channel analyzer 304 is configured to write a predetermined sequence to the disk 112, and analyze a readback signal generated by the read channel device 136 to determine one or more parameters of one or more of the read channel device 136, the write channel device 138, the magnetic head 116, the disk 112, etc. The determined one or more parameters are used by the hard disk control system 108 to improve the reading of data written to the disk 112.

The channel analyzer 304 includes a pseudorandom bit sequence (PRBS) write control unit 308 that is configured to generate a known sequence having one or more instances of a PRBS and provide the known sequence to the write channel device 138. Additionally, the PRBS write control unit 308 is configured to control the actuator controller 140 to move the magnetic heads 116 to a desired position for writing the known sequence to the disk 112. The write channel device 138 generates an analog write signal, based on the known sequence, and provides the analog write signal to the appropriate magnetic head 116 while the magnetic head 116 is at the desired position such that the known sequence is magnetically stored on the disk 112 at the desired position. In an embodiment, the known sequence includes multiple instances of the PRBS such that the analog write signal generated by the write channel device 138 corresponds to a repetition of the PRBS. In an embodiment, the PRBS write control unit 308 is configured to write the known sequence to the disk 112 on each of multiple adjacent tracks.

After the known sequence has been written one or more times on the disk 112, the channel analyzer 304 is configured to control the actuator controller 140 to move the magnetic heads 116 to a desired position for reading the known sequence from the disk 112. While the magnetic head 116 is at the desired position, the read channel device 136 generates a readback signal, and provides the readback signal to a signal analyzer 312 (sometimes referred to herein as a "dipulse analyzer"). The readback signal corresponds to the known sequence written on the disk 112, and the signal analyzer 312 is configured to correlate the readback signal with the known signal to generate a correlation signal (sometimes referred to herein as a "dipulse response" as shown in FIG. 3). The signal analyzer 312 is configured to analyze the correlation signal to identify one or more characteristics of the correlation signal. The signal analyzer 312 is further configured to determine one or more parameters of a communication channel using the identified one or more characteristics of the correlation signal, where the communication channel corresponds to the magnetic head 116 and the disk 112, and optionally at least a portion of the read channel device 136 and/or at least a portion of the write channel device 138. For example, the signal analyzer 312 is configured to determine one or more parameters corresponding to one of, or any suitable combination of two or more of, the read channel device 136, the write channel device 138, the magnetic head 116, and the disk 112.

The hard disk control system 108 is configured to use the determined one or more parameters of the communication channel to process subsequent readback signals received via the read channel device 136 to improve data recovery accuracy, according to an embodiment.

Generally, parameter resolution improves as the length of the known sequence (and/or the length of the PRBS within the known sequence) increases. As an illustrative example, a length of the PRBS is 127 and the PRBS is repeated 16 times. As another illustrative example, a length of the PRBS is 127 and the PRBS is repeated 32 times. Other suitable lengths of the known sequence and/or other suitable lengths of the PRBS and/or other suitable numbers of repetitions of the PRBS are utilized in other embodiments. In an embodiment, an order of the PRBS is N (a suitable positive integer such as 4, 5, 6, 7, 8, etc.), corresponding to a length of the PRBS of $2^N-1$. As an illustrative example, an order of seven (i.e., N=7) results in a PRBS length of 127, according to an embodiment.

In an embodiment, the channel analyzer 304 comprises hardware circuitry configured to perform some or all of the operations described above. For example, the PRBS write control unit 308 includes (or is coupled to) a memory device (not shown) that stores the PRBS. In an embodiment, the PRBS write control unit 308 includes a hardware state machine configured to control the actuator controller 140 to move the magnetic heads 116 to the desired position for writing the known sequence to the disk 112. In an embodiment, the hardware state machine is configured to provide the known sequence to the write channel while the magnetic head 116 is in the desired position. In an embodiment, the signal analyzer 312 includes a correlator circuit configured to generate the correlation signal. In an embodiment, the signal analyzer 312 includes circuitry configured to generate the correlation signal. In an embodiment, the signal analyzer 312 includes circuitry configured to identify one or more characteristics of the correlation signal and/or to determine one or more parameters of a communication channel using the identified one or more characteristics of the correlation signal.

In an embodiment, the channel analyzer 304 is implemented using a processor and a memory device coupled to the processor, wherein the memory device stores machine readable instructions that, when executed by the processor, perform some or all of the operations described above.

Other components of the hard disk control system 108 are implemented using hardware circuitry and/or a processor that executed machine readable instructions, according to various embodiments. For instance, the read channel device 136 comprises hardware circuitry configured to generate a digital signal based on an analog signal from the magnetic head 116, according to an embodiment. As an illustrative example, the read channel device 136 includes an analog-to-digital converter (ADC) and one or more analog or digital filters for processing analog or digital signals. The write channel device 138 comprises hardware circuitry configured to generate an analog signal to be provided to the magnetic head 116 based on a digital signal from the HDC 132 or the channel analyzer 304, according to an embodiment. As an illustrative example, the write channel device 138 includes a digital-to-analog converter (DAC) and one or more analog or digital filters for processing analog or digital signals.

In an embodiment, the read channel device 136 employs a clock signal to drive components of the read channel device 136, such as the ADC and a digital filter (if included). A frequency at which bits are written to the disk 112 (write frequency) is typically offset from a frequency of the clock used by the read channel device 136. Such a frequency offset adversely affects the reading of data from the disk 112. The offset may be caused by a frequency difference between a first frequency at which data is written to the disk 112, and a second frequency at which data is read from the disk 112, e.g., caused by variations in a rotation rate of the disks 112. Additionally or alternatively, the offset may be caused by a frequency difference between a reference clock signal used by the read channel device 136 and a frequency at which data is read from the disk 112.

The HDC 132 comprises hardware circuitry such as a hardware state machine, according to an embodiment. Additionally or alternatively, the HDC 132 is implemented using a processor and a memory device coupled to the processor, wherein the memory device stores machine readable instructions that, when executed by the processor, perform some or all of the operations of the HDC 132. The actuator controller 140 comprises hardware circuitry such as a hardware state machine, according to an embodiment. Additionally or alternatively, the actuator controller 140 is implemented using a processor and a memory device coupled to the processor, wherein the memory device stores machine readable instructions that, when executed by the processor, perform some or all of the operations of the actuator controller 140. The interface 128 comprises hardware circuitry such as a hardware state machine, according to an embodiment. Additionally or alternatively, the interface 128 is implemented using a processor and a memory device coupled to the processor, wherein the memory device stores machine readable instructions that, when executed by the processor, perform some or all of the operations of the interface 128.

Figure 4:
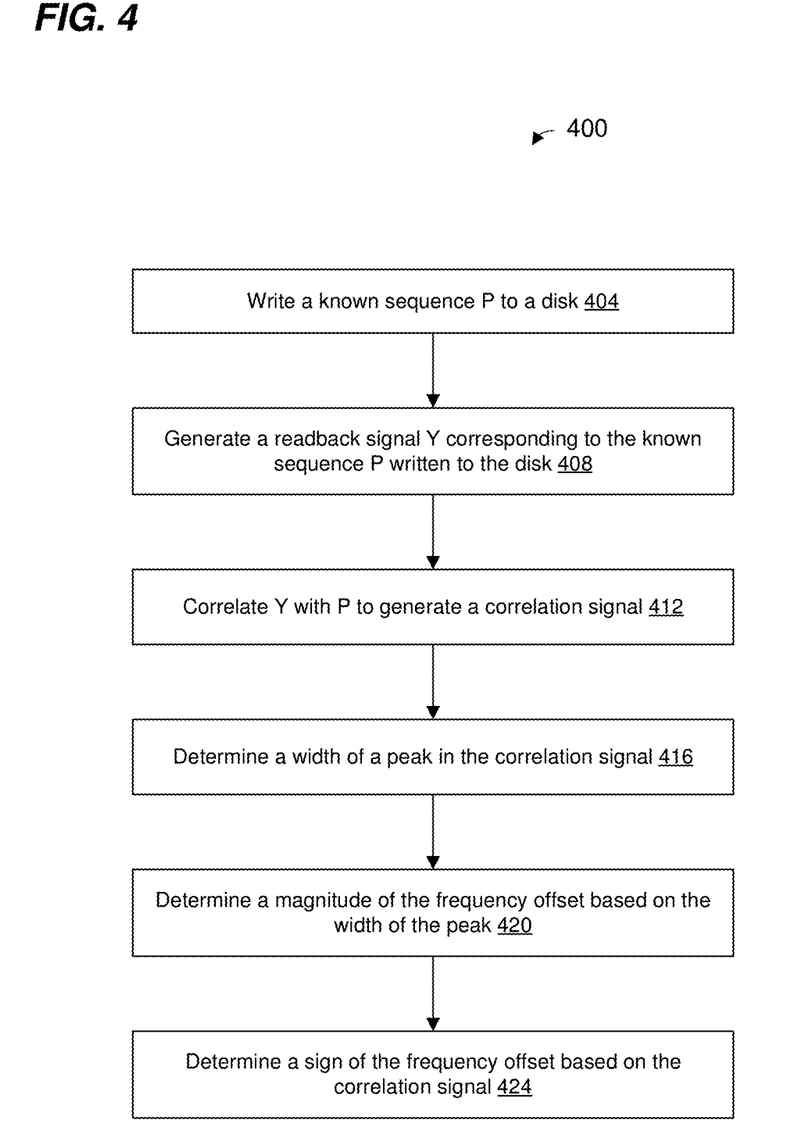
FIG. 4 is a flow diagram of an example method for determining a frequency offset parameter corresponding to a read channel in a hard disk drive system, according to an embodiment.

FIG. 4 is a flow diagram of an example method 400 for determining a frequency offset parameter corresponding to a read channel in a hard disk drive system, according to an embodiment. The frequency offset parameter corresponds to an offset between a frequency at which bits are written to the disk 112 (write frequency) and a frequency of the clock used by the read channel device of the hard disk drive system.

In some embodiments, the hard disk drive system 300 of FIG. 3 is configured to implement the method 400. The method 400 is described, however, in the context of the hard disk drive system 300 merely for explanatory purposes and, in other embodiments, the method 400 is implemented by another suitable device.

At block 404, a known sequence P is written to a disk of the hard disk drive system. For example, the channel analyzer 304 writes the known sequence P to the disk 112 via the write channel device 138. The known sequence P includes a PRBS. In an embodiment, the known sequence P includes multiple instances of the PRBS.

At block 408, a readback signal Y is generated, wherein the readback signal Y corresponds to the known sequence P written to the disk. For example, the channel analyzer 304 controls the actuator controller 140 and the read channel device 136 to generate the readback signal Y.

At block 412, the readback signal Y is correlated with the known sequence P to generate a correlation signal. For example, the dipulse analyzer 312 generates the correlation signal.

Figure 5A:
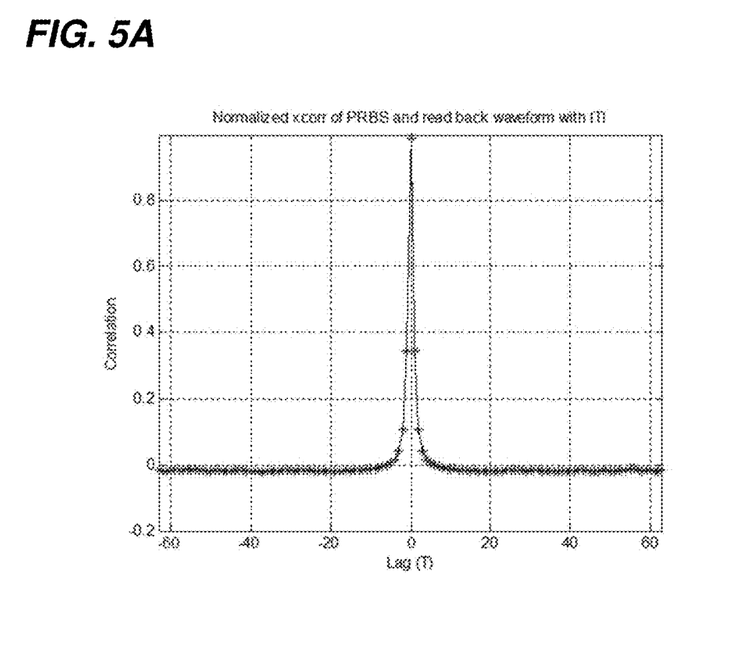
FIG. 5A is a diagram of an example correlation signal corresponding to a known sequence and a readback signal in a hard disk drive, when there is no frequency offset associated with a read channel device of the hard disk drive, according to an embodiment.

FIG. 5A is a diagram of an example correlation signal (corresponding to the correlation of Y and P) when there is no frequency offset. As can be seen in FIG. 5A, the correlation of Y and P has a single narrow peak.

Figure 5B:
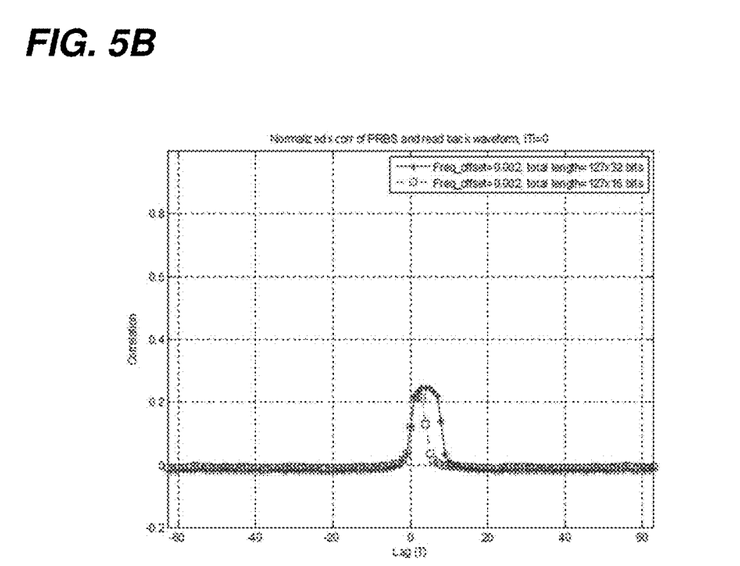
FIG. 5B is a diagram of example correlation signals corresponding to known sequences and a readback signal in a hard disk drive, when there is a positive frequency offset associated with a read channel device of the hard disk drive, according to an embodiment.
Figure 5C:
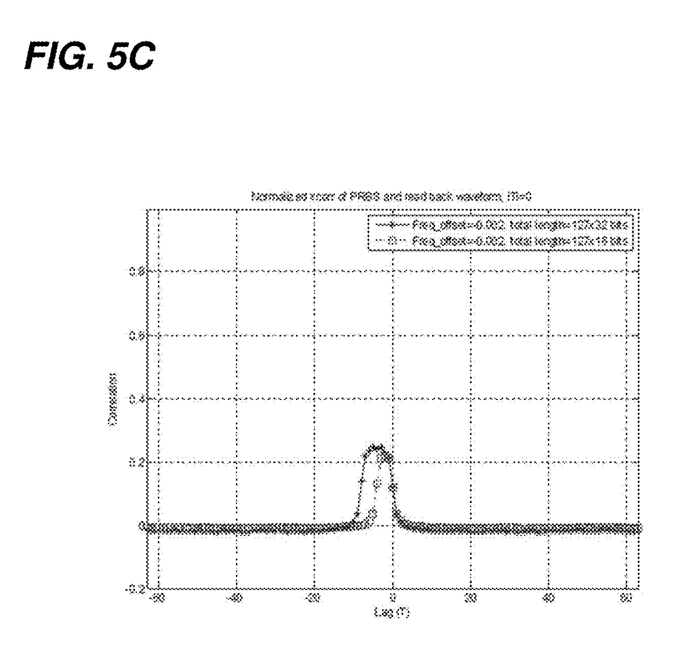
FIG. 5C is a diagram of example correlation signals corresponding to known sequences and a readback signal in a hard disk drive, when there is a negative frequency offset associated with a read channel device of the hard disk drive, according to an embodiment.

On the other hand, when a frequency offset exists, the correlation of Y and P exhibits distinctive signature. In particular, the correlation will have a relatively flat top, and a pseudo rectangular shape. FIG. 5B is a diagram of example correlation signals (corresponding to the correlation of Y and P) when a positive frequency offset exists. Two correlation signals corresponding to readback sequences Y of different lengths are shown in FIG. 5B. As can be seen in FIG. 5B, the correlation signals have lower but wider peaks (as compared to the correlation signal of FIG. 5A). FIG. 5C is a diagram of example correlation signals (corresponding to the correlation of Y and P) when a negative frequency offset exists. Two correlation signals corresponding to readback sequences Y of different lengths are shown in FIG. 5C. As can be seen in FIG. 5C, the correlation signals have lower but wider peaks (as compared to the correlation signal of FIG. 5A).

The width of the peak in the correlation signal corresponds to the magnitude of the frequency offset, and the relative position of different correlation peaks indicates the sign of the frequency offset. Thus, a determined width of a peak in the correlation signal can be used to determine the magnitude of the frequency offset, and the relative position of different peaks in the correlation signal can be used to determine a sign of the offset. In an embodiment, the frequency offset is determined by analyzing characteristics of the correlation signals (e.g., widths of peaks and relative positions of different peaks).

Referring again to FIG. 4, at block 416, a width of a peak in the correlation signal is determined. For example, the dipulse analyzer 312 determines the width of the peak in the correlation signal. In an embodiment, block 416 includes: finding a maximum value (c0) of the correlation signal; and determining a number of samples (m) of the correlation signal that are above c0/n, wherein n is suitable positive integer such as 2, 3, 4, 5, 6, 7, 8, 9, 10, etc. In an embodiment, m corresponds to the width of the peak in the correlation signal.

At block 420, a magnitude of the frequency offset is determined based on the width of the peak determined at block 416. For example, the magnitude of the frequency offset is determined as (m−1)/corr_length, where corr_length is a length of the correlation signal.

At block 424, a sign of the frequency offset is determined using the readback signal Y. In an embodiment, block 424 includes: correlating a first half of the readback signal Y with P to generate a further correlation signal; determining whether the further correlation signal aligns to a first half (e.g., a left hand portion) of the correlation signal or to a second half (e.g., a right hand portion) of the correlation signal; determining that the frequency offset is positive if the further correlation signal aligns to the first half (e.g., the left hand portion) of the correlation signal; and determining that the frequency offset is negative if the further correlation signal aligns to the second half (e.g., the right hand portion) of the correlation signal. In another embodiment, when data format has a sync mark, a location of the sync mark relative to the peak 0 is used to determine a sign of the frequency offset.

In an embodiment, the hard disk control system 108 is configured to use the determined frequency offset to improve the reading of data from the disk(s) 112. For example, in an embodiment, the hard disk control system 108 is configured to modify, according to the determined frequency offset, a frequency of a clock used by the read channel device 136 so that the frequency of the clock used by the read channel device 136 better matches a frequency of a clock used by the write channel device 138.

In an embodiment, the method 400 is performed in a manufacturing and/or testing facility to configure the hard disk drive system 300 and/or the hard disk control system 108. In an embodiment, the method 400 is performed in the field to configure the hard disk drive system 300 and/or the hard disk control system 108.

In some embodiments, methods similar to the method 400 are utilized to estimate one or more parameters of the hard disk drive system 300 different than frequency offset. For example, a method similar to the method 400 is used to determine one or more asymmetry parameters corresponding to an amplitude difference between positive peaks and negative peaks in the readback signal (which may be caused by characteristics of the magnetic head 116). More specifically, the correlation signal generated at block 412 is analyzed to identify one or more characteristics indicative of the asymmetry, and one or more asymmetry parameters are determined using the one or more identified characteristics indicative of the asymmetry. In an embodiment, when asymmetry exists, the correlation signal in 412 exhibits an echo of a main peak at certain distance from the main peak. The distance is related to the PRBS period. A ratio of i) a magnitude of the echo peak with ii) a magnitude of the main peak indicates an amount of asymmetry. In an embodiment, the hard disk control system 108 is configured to use the determined one or more asymmetry parameters to improve the reading of data from the disk(s) 112. For example, in an embodiment, the hard disk control system 108 is configured to modify, according to the determined ratio, the readback signal to counteract the asymmetry, e.g., to reduce the amplitude difference between positive peaks and negative peaks in the readback signal.

In some embodiments, one known signal written to the disk 112 can be used to determine several different parameters (e.g., two or more of a frequency offset parameter, an asymmetry parameter, etc.). For example, blocks 404 and 408 are performed once, and then multiple correlation signals are generated for respectively determining multiple different parameters. As another example, blocks 404, 408, and 412 are performed once to generate a correlation signal, and then the correlation signal is analyzed to determine multiple different parameters.

Figure 6:
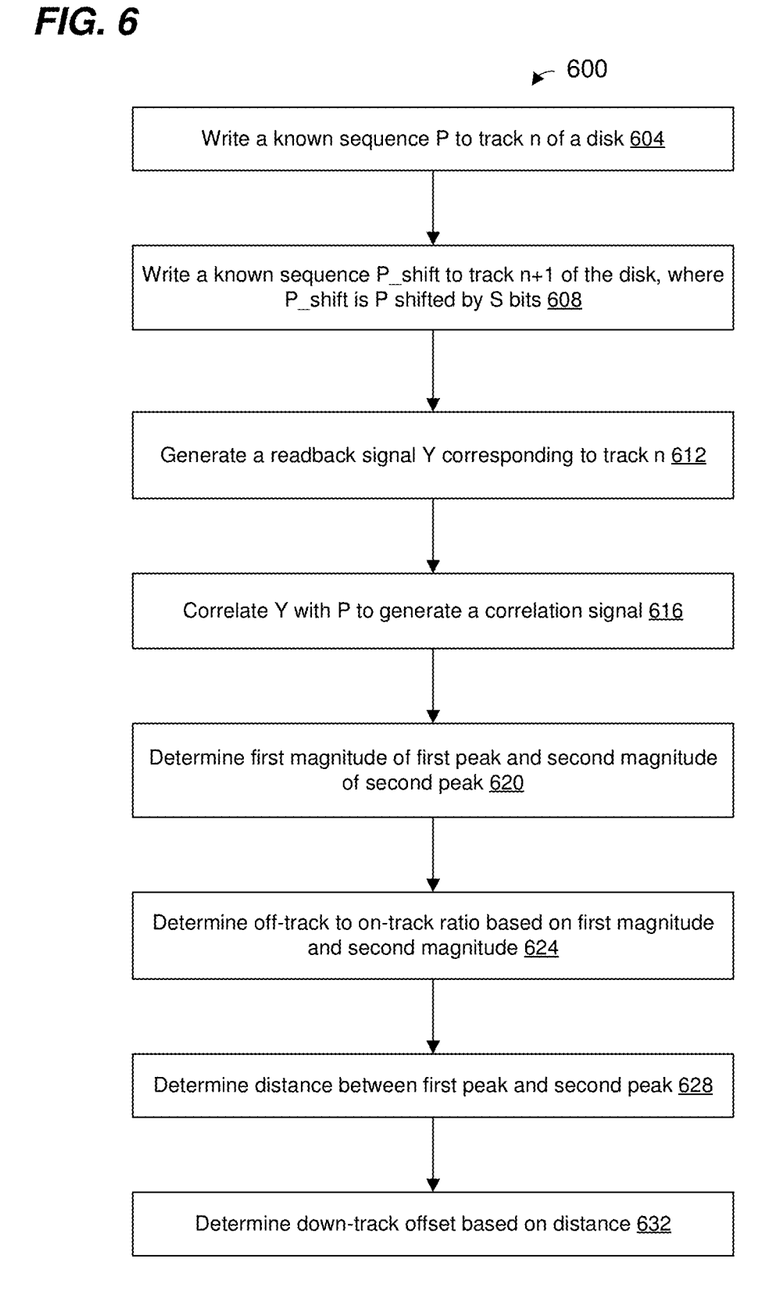
FIG. 6 is a flow diagram of an example 600 for determining intertrack interference (ITI) parameters corresponding to a hard disk drive system, according to an embodiment.

FIG. 6 is a flow diagram of an example method 600 for determining intertrack interference (ITI) parameters corresponding to a hard disk drive system, according to an embodiment. The ITI parameters corresponds to ITI at a track n caused by a track n+1. For example, when the magnetic head 116 is positioned over a particular track, the magnetic head 116 will typically generate an interference signal from an adjacent track. Such ITI adversely affects the reading of data from the disk 112.

In some embodiments, the hard disk drive system 300 of FIG. 3 is configured to implement the method 600. The method 600 is described, however, in the context of the hard disk drive system 300 merely for explanatory purposes and, in other embodiments, the method 600 is implemented by another suitable device.

Referring to FIG. 6, at block 604, a known sequence P is written to track n of a disk of the hard disk drive system. For example, the channel analyzer 304 writes the known sequence P to track n of the disk 112 via the write channel device 138. The known sequence P includes a PRBS. In an embodiment, the known sequence P includes multiple instances of the PRBS.

At block 608, a known sequence P_shift is written to track n+1 of a disk of the hard disk drive system. For example, the channel analyzer 304 writes the known sequence P_shift to track n+1 of the disk 112 via the write channel device 138. The known sequence P_shift corresponds to the known sequence P shifted (e.g., circularly shifted) by S bits, where S is a suitable integer that is suitably distant from i) zero and ii) a downtrack offset between track n and track n+1.

At block 612, a readback signal Y for track n is generated. For example, the channel analyzer 304 controls the actuator controller 140 and the read channel device 136 to generate the readback signal Y. Y can be modeled as $Y(t)=X(t)+W(t)$, where $X(t)$ corresponds to the known sequence P written to the disk at track n, and $W(t)$ corresponds to ITI caused by the known sequence P_shift written to the disk at track n+1.

At block 616, the readback signal Y is correlated with the known sequence P to generate a correlation signal. For example, the dipulse analyzer 312 generates the correlation signal.

Figure 7:
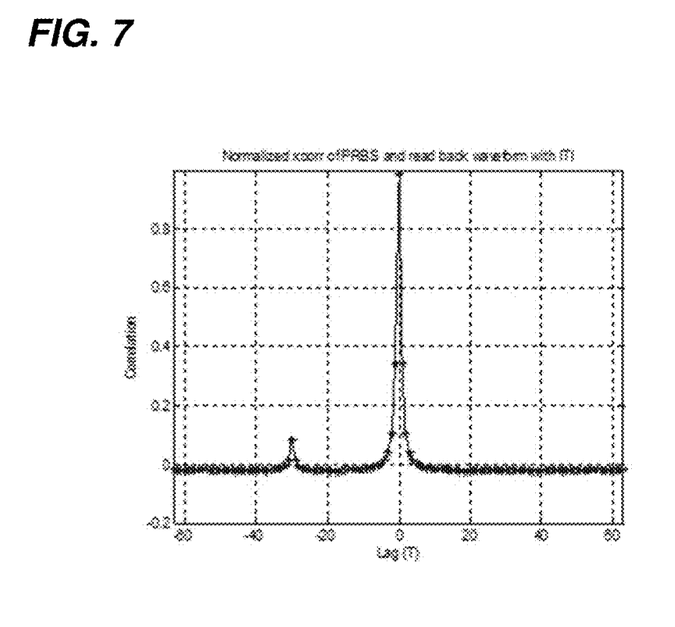
FIG. 7 is a diagram of an example correlation signal corresponding to a known sequence and a readback signal from a track on a disk, where the readback signal includes ITI corresponding to an adjacent track on the disk, according to an embodiment.

FIG. 7 is a diagram of an example correlation signal (corresponding to the correlation of Y and P). As can be seen in FIG. 7, the correlation of Y and P has a first tall peak that corresponds to P written to the track n, and a second shorter peak that corresponds to ITI caused by P_shift written to the track n+1.

Referring again to FIG. 6, at block 620, a first magnitude of the first peak in the correlation signal is determined, and a second magnitude of the second peak in the correlation signal is determined. For example, the dipulse analyzer 312 determines the first magnitude of the first peak and the second magnitude of the second peak. In an embodiment, block 620 includes one or both of: i) performing interpolation to increase resolution to determine the first peak between first adjacent samples of the correlation signal, ii) performing interpolation to increase resolution to determine the second peak between second adjacent samples of the correlation signal.

At block 624, a first parameter corresponding to an amount of ITI is determined using the first magnitude and the second magnitude determined at block 620. For example, the dipulse analyzer 312 determines first parameter based on the first magnitude of the first peak and the second magnitude of the second peak. As an illustrative example, an off-track to on-track ratio is determined as a ratio of the first magnitude and the second magnitude, according to an embodiment.

At block 628, a distance between the first peak and the second peak in the correlation signal is determined. For example, the dipulse analyzer 312 determines the distance between the first peak and the second peak.

At block 632, a second parameter corresponding to ITI is determined using the distance determined at block 628. For example, the dipulse analyzer 312 determines second parameter based on the distance. As an illustrative example, a down-track offset is as the distance determined at block 628, according to an embodiment.

In an embodiment, the hard disk control system 108 is configured to use the determined one or more ITI parameters to improve the reading of data from and/or the writing of data to the disk(s) 112. For example, in an embodiment, the determined one or more ITI parameters can be used by the hard disk control system 108 to better control the position of the head 116. For instance, in an embodiment, the ratio of peak magnitude indicates a cross-track position cross of the head 116 because as the position of the head 116 moves further from a center of the track towards an adjacent neighbor track, the head 116 will pick up more and more information from the neighbor track. Thus, the hard disk control system 108 can use a change of the ratio of peak magnitude to calibrate a position of the head 116 over a track and optimize a channel equalizer selection.

In an embodiment, the method 600 is performed in a manufacturing and/or testing facility to configure the hard disk drive system 300 and/or the hard disk control system 108. In an embodiment, the method 600 is performed in the field to configure the hard disk drive system 300 and/or the hard disk control system 108.

Although signal analysis and parameter determination techniques were discussed above in the context of a magnetic disk drive, similar techniques may be utilized to determine parameters corresponding to an optical disk drive system that comprises one or more optical disks and one or more optical heads.

Although signal analysis and parameter determination techniques were discussed above in the context of a magnetic or optical disk drive, similar techniques may be utilized to determine parameters corresponding to other types of bandwidth-limited communication channels, such as wired and wireless communication channels including one or more of metallic cables, fiber optic cables, wireless radio frequency (RF) communication channels, wireless microwave communication channels, wireless optical communication channels, etc.

Figure 8:
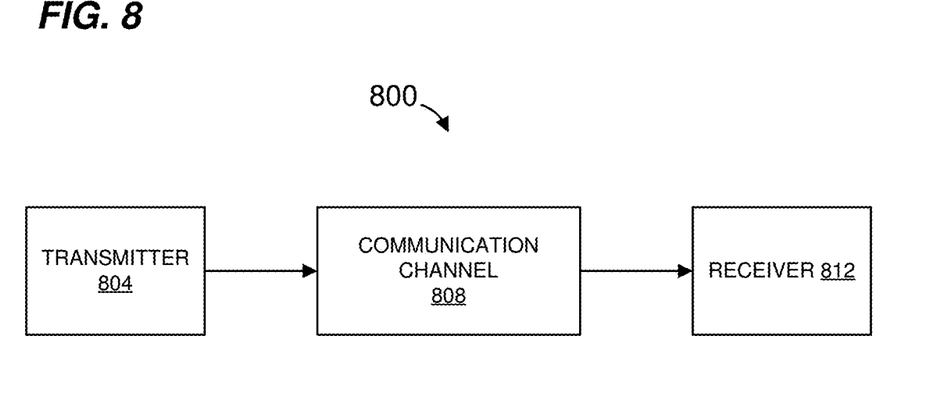
FIG. 8 is a block diagram of an example communication system, according to an embodiment.

FIG. 8 is a diagram of a communication system 800 in which signal analysis and parameter determination techniques discussed above are utilized to determine parameters corresponding to a bandwidth-limited communication channel, according to an embodiment.

The communication system 800 includes a transmitter device 804, a bandwidth-limited communication channel 808, and a receiver device 812. In one embodiment, the communication system 800 corresponds to disk drive system, and the communication channel 808 includes a magnetic or optical disk. Referring now to FIGS. 3 and 8, as an illustrative example, the communication channel 808 corresponds to the magnetic (or optical) head 116 and the magnetic (or optical) disk 112, and optionally at least a portion of the read channel device 136 and/or at least a portion of the write channel device 138. In an embodiment, the PRBS write control unit 308 is included in, or coupled to, the transmitter 804. In an embodiment, the correlation signal analyzer 312 is included in, or coupled to, the receiver 812.

In another embodiment, the communication channel 808 corresponds to a wired communication channel corresponding to metallic cables or fiber optic cables. In another embodiment, the communication channel 808 corresponds to a wireless communication channel corresponding to RF communications, microwave communications, or optical communications. In such embodiments, the transmitter device 804 is configured to transmit a known signal via the communication channel 808, where the known signal includes one or more instances of a PRBS. The known signal is similar to the known signal P discussed above with respect to FIGS. 3, 4, and 6, according to various embodiments. In an embodiment, the transmitter device 804 is also configured to transmit another known signal via an adjacent (e.g., in frequency, via another spatial or space-time stream, etc.) communication channel, where the other known signal includes one or more instances of a PRBS. The other known signal is similar to the signal P_shift discussed above with respect to FIG. 6, according to an embodiment.

The receiver device 812 includes a signal analyzer similar to the signal analyzer 312, where the signal analyzer is configured to generate a correlation signal and analyze the correlation signal in a manner similar to the signal analyzer 312.

Figure 9:
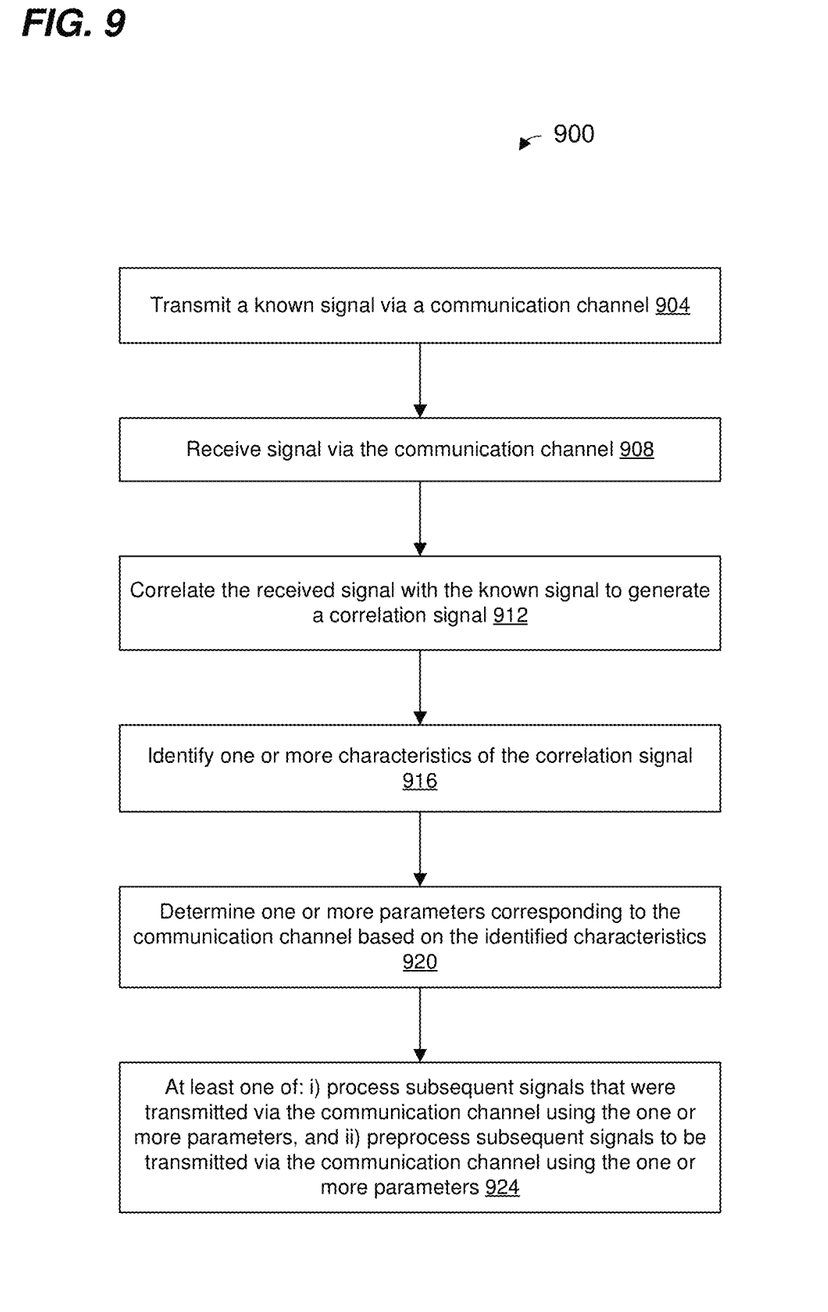
FIG. 9 is a flow diagram of an example method for determining and using one or more parameters corresponding to a communication channel, according to an embodiment.

FIG. 9 is a flow diagram of an example method 900 for determining and using one or more parameters corresponding to a communication channel, according to an embodiment. In some embodiments, the communication system 800 of FIG. 8 is configured to implement the method 900. The method 900 is described, however, in the context of the hard disk drive system 800 merely for explanatory purposes and, in other embodiments, the method 900 is implemented by another suitable communication system.

Referring to FIG. 9, at block 904, a transmitter device (e.g., the transmitter device 804) transmits a known sequence P via a communication channel (e.g., the communication channel 808). The known sequence P includes a PRBS. In an embodiment, the known sequence P includes multiple instances of the PRBS.

In some embodiments, the transmitter device (e.g., the transmitter device 804) transmits another known sequence P_shift via another communication channel. The other known sequence P_shift also includes a PRBS. In an embodiment, the other known sequence P_shift includes multiple instances of the PRBS. In an embodiment, the other known sequence P_shift is P bit-shifted by S bits.

In some embodiments, the method 900 does not include transmitting the other known sequence P_shift via the other communication channel.

At block 908, a receiver device (e.g., the receiver device 812) receives a signal via the communication channel, where the received signal corresponds to the known sequence P transmitted at block 904.

At block 912, the receiver device (e.g., the receiver device 812) correlates the received signal and the known signal to generate a correlation signal, where the received signal corresponds to the known sequence P transmitted at block 904.

At block 916, the receiver device (e.g., the receiver device 812) analyzes the correlation signal to identify one or more characteristics of the correlation signal.

At block 920, the receiver device (e.g., the receiver device 812) determines one or more parameters corresponding to the communication channel based on the one or more identified characteristics of the correlation signal.

At block 924, at least one of: i) the receiver device (e.g., the receiver device 812) uses the one or more parameters corresponding to the communication channel to process subsequent signals received via the communication channel; and ii) the receiver device (e.g., the receiver device 812) communicates one or more of the determined parameters to the transmitter device (e.g., the transmitter device 804), and the transmitter device preprocesses subsequent signals to be transmitted via the communication channel using the communicated one or more parameters.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method in a data storage system having i) a storage device that stores data and ii) a read channel device for reading data from the storage device, the method comprising:

receiving, at a receiver device of the data storage system, a signal via a communication channel of the data storage system, the signal (i) having been transmitted by a transmitter device of the data storage system, and (ii) corresponding to a pseudorandom bit sequence (PRBS);

correlating, at the receiver device, the received signal with a known signal to generate a correlation signal, wherein the known signal includes the PRBS;

identifying, at the receiver device, one or more characteristics of the correlation signal;

determining, at the receiver device, one or more parameters of the communication channel using the identified one or more characteristics of the correlation signal, including determining one or more of i) a frequency offset corresponding to a clock used by the receiver device, ii) a signal asymmetry parameter, and iii) a cross-track position of an optical or magnetic head of a magnetic or optical disk drive; and using, at the receiver device, the one or more parameters corresponding to the communication channel to process subsequent signals received via the communication channel.

2. The method of claim 1, wherein:

identifying one or more characteristics of the correlation signal includes determining a width of a peak in the correlation signal;

determining one or more parameters of the communication channel includes determining the frequency offset using the determined width of the peak; and using the one or more parameters corresponding to the communication channel to process subsequent signals received via the communication channel comprises using, at the receiver device, the determined frequency offset to process the subsequent signals received via the communication channel.

3. The method of claim 1, wherein:

determining one or more parameters of the communication channel includes determining the signal asymmetry parameter using the identified one or more characteristics of the correlation signal, wherein the signal asymmetry parameter corresponds to a difference between a peak magnitude of positive peaks of signals received via the communication channel and a peak magnitude of negative peaks of signals received via the communication channel; and using the one or more parameters corresponding to the communication channel to process subsequent signals received via the communication channel comprises using, at the receiver device, the determined signal asymmetry parameter to process the subsequent signals.

4. The method of claim 1, wherein:

the data storage system is a disk drive system comprising i) an optical or magnetic disk, and ii) the optical or magnetic head;

the receiver device corresponds to the read channel device of the disk drive system, the read channel device being configured to generate a readback signal corresponding to data written to the disk;

the transmitter device corresponds to a write channel device of the disk drive system, the write channel device being configured to write data to the disk;

receiving the signal via the communication channel comprises generating, at the read channel device, the readback signal based on the PRBS written to the disk by the write channel device;

determining the one or more parameters of the communication channel includes determining one or more parameters corresponding to one or more of i) the read channel device, ii) the write channel device, iii) the optical or magnetic disk, and iv) the optical or magnetic head; and using the one or more parameters corresponding to the communication channel to process subsequent signals received via the communication channel comprises using the one or more parameters to process subsequent readback signals generated by the read channel device.

5. The method of claim 4, wherein:

identifying one or more characteristics of the correlation signal includes determining a width of a peak in the correlation signal; and determining one or more parameters includes determining the frequency offset using the determined width of the peak; and using the one or more parameters to process subsequent readback signals generated by the read channel device includes using the determined frequency offset to adjust the clock used by the read channel device.

6. The method of claim 4, wherein:

determining one or more parameters of the communication channel includes determining the signal asymmetry parameter using the identified one or more characteristics of the correlation signal, wherein the signal asymmetry parameter corresponds to a difference between a peak magnitude of positive peaks in the readback signal and a peak magnitude of negative peaks in the readback signal; and using the one or more parameters to process subsequent signals includes using the determined signal asymmetry parameter to process the subsequent readback signals.

7. The method of claim 4, wherein:

identifying one or more characteristics of the correlation signal includes determining a ratio of a magnitude of a first peak in the correlation signal to a magnitude of a second peak in the correlation signal, wherein the first peak corresponds to data written to a first track of the optical or magnetic disk, and wherein the second peak corresponds to data written to a second track of the optical or magnetic disk that is adjacent to the first track; and using the one or more parameters to process subsequent signals includes using the determined ratio to select an equalizer to process readback signals.

8. The method of claim 7, further comprising:

using the determined ratio to calibrate a position of the optical or magnetic head over the first track.

9. An apparatus in a data storage system having i) a storage device that stores data and ii) a read channel device for reading data from the storage device, the apparatus comprising:

one or more integrated circuit (IC) devices that include circuitry configured to:

receive a signal via a communication channel of the data storage system, the signal (i) having been transmitted by a transmitter device of the data storage system, and (ii) corresponding to a pseudorandom bit sequence (PRBS), correlate the received signal with a known signal to generate a correlation signal, wherein the known signal includes the PRBS, identify one or more characteristics of the correlation signal, determine one or more parameters of the communication channel using the identified one or more characteristics of the correlation signal, including determining one or more of i) a frequency offset corresponding to a clock used at the one or more IC devices, ii) a signal asymmetry parameter, and iii) a cross-track position of an optical or magnetic head of a magnetic or optical disk drive, and use the one or more parameters corresponding to the communication channel to process subsequent signals received via the communication channel.

10. The apparatus of claim 9, wherein the circuitry is further configured to:

determine a width of a peak in the correlation signal;

determine the frequency offset using the determined width of the peak; and use the determined frequency offset to process the subsequent signals received via the communication channel.

11. The apparatus of claim 9, wherein the circuitry is further configured to:

determine the signal asymmetry parameter using the determined one or more parameters of the communication channel, wherein the signal asymmetry parameter corresponds to a difference between a peak magnitude of positive peaks of signals received via the communication channel and a peak magnitude of negative peaks of signals received via the communication channel; and use the determined signal asymmetry parameter to process the subsequent signals.

12. The apparatus of claim 9, wherein:

the data storage system is a disk drive system comprising i) an optical or magnetic disk, and ii) the optical or magnetic head;

at least one of: i) the one or more IC devices are coupled to at least a first portion of a read channel device of the disk drive system, or ii) at least a second portion of the read channel device is implemented on the one or more IC devices, wherein the read channel device is configured to generate a readback signal corresponding to data written to the disk;

at least one of: i) the one or more IC devices are coupled to at least a first portion of a write channel device of the disk drive system, or ii) at least a second portion of the write channel device is implemented on the one or more IC devices, wherein the write channel device is configured to write data to the disk;

the read channel device is configured to generate the readback signal based on the PRBS written to the disk by the write channel device;

the circuitry is further configured to:

determine one or more parameters corresponding to one or more of i) the read channel device, ii) the write channel device, iii) the optical or magnetic disk, and iv) the optical or magnetic head, and use the one or more parameters to process subsequent readback signals generated by the read channel device.

13. The apparatus of claim 12, wherein the circuitry is further configured to:

determine a width of a peak in the correlation signal; and determine the frequency offset using the determined width of the peak, wherein the frequency offset corresponds to the read channel device; and use the determined frequency offset to process the subsequent readback signals generated by the read channel device.

14. The apparatus of claim 12, wherein the circuitry is further configured to:

determine the signal asymmetry parameter using the determined one or more parameters of the communication channel, wherein the signal asymmetry parameter corresponds to a difference between a peak magnitude of positive peaks in the readback signal and a peak magnitude of negative peaks in the readback signal; and use the determined signal asymmetry parameter to process the subsequent readback signals.

15. The apparatus of claim 12, wherein the circuitry is further configured to:

determine a ratio of a magnitude of a first peak in the correlation signal to a magnitude of a second peak in the correlation signal, wherein the first peak corresponds to data written to a first track of the optical or magnetic disk, and wherein the second peak corresponds to data written to a second track of the optical or magnetic disk that is adjacent to the first track; and use the one or more parameters to process subsequent signals includes using the determined ratio to select an equalizer to process readback signals.

16. The apparatus of claim 15, further the circuitry is further configured to:

use the determined ratio to calibrate a position of the optical or magnetic head over the first track.

17. The apparatus of claim 12, wherein:

at least the second portion of the read channel device is implemented on the one or more IC devices;

at least the second portion of the write channel device is implemented on the one or more IC devices.

18. A system comprising the apparatus of claim 17, wherein the system further comprises:

the optical or magnetic disk;

the optical or magnetic head; and an actuator coupled to the optical or magnetic head; and a disk driver controller implemented on the one or more IC devices;

wherein the one or more IC devices are coupled to i) the optical or magnetic head, and ii) the actuator.

19. The apparatus of claim 9, wherein the circuitry comprises:

a correlator circuit configured to generate the correlation signal; and a hardware state machine.

20. The apparatus of claim 9, wherein the circuitry comprises:

a processor configured to execute machine readable instructions; and a memory coupled to the processor, wherein the memory stores machine readable instructions that, when executed by the processor, cause the processor to:

identify one or more characteristics of the correlation signal, determine one or more parameters of the communication channel using the identified one or more characteristics of the correlation signal, and cause the circuitry to use the one or more parameters corresponding to the communication channel to process subsequent signals received via the communication channel.

* * * * *